US011358588B2

(12) United States Patent
Kim

(10) Patent No.: US 11,358,588 B2
(45) Date of Patent: Jun. 14, 2022

(54) APPARATUS FOR PROTECTING INVERTER OF HYBRID VEHICLE

(71) Applicants: HYUNDAI MOTOR COMPANY, Seoul (KR); KIA MOTORS CORPORATION, Seoul (KR)

(72) Inventor: Tae Woo Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 386 days.

(21) Appl. No.: 16/696,580

(22) Filed: Nov. 26, 2019

(65) Prior Publication Data

US 2020/0361447 A1 Nov. 19, 2020

(30) Foreign Application Priority Data

May 17, 2019 (KR) ........................ 10-2019-0057847

(51) Int. Cl.

| | |
|---|---|
| ***B60W 20/40*** | (2016.01) |
| ***B60K 17/22*** | (2006.01) |
| ***B60K 6/38*** | (2007.10) |
| ***B60K 6/48*** | (2007.10) |
| ***B60K 6/28*** | (2007.10) |
| ***B60K 6/24*** | (2007.10) |
| ***B60W 20/50*** | (2016.01) |
| ***B60W 10/10*** | (2012.01) |
| ***B60W 10/08*** | (2006.01) |
| ***B60W 10/02*** | (2006.01) |
| ***B60K 6/26*** | (2007.10) |

(52) U.S. Cl.

CPC ............... *B60W 20/40* (2013.01); *B60K 6/24* (2013.01); *B60K 6/26* (2013.01); *B60K 6/28* (2013.01); *B60K 6/38* (2013.01); *B60K 6/48* (2013.01); *B60K 17/22* (2013.01); *B60W 10/02* (2013.01); *B60W 10/08* (2013.01); *B60W 10/10* (2013.01); *B60W 20/50* (2013.01); *B60K 2006/4825* (2013.01); *B60W 2510/081* (2013.01); *B60Y 2200/92* (2013.01)

(58) Field of Classification Search

None

See application file for complete search history.

(56) References Cited

FOREIGN PATENT DOCUMENTS

| | | | |
|---|---|---|---|
| KR | 100887843 | B1 * | 2/2009 |
| KR | 10-0887843 | B1 | 3/2009 |
| KR | 20090110673 | A * | 10/2009 |

* cited by examiner

*Primary Examiner* — Dirk Wright

(74) *Attorney, Agent, or Firm* — Morgan, Lewis & Bockius LLP

(57) ABSTRACT

An apparatus for protecting an inverter of a hybrid vehicle traveling using a motor connected to a vehicle drive shaft through a transmission and an engine connected to the motor through an engine clutch, the apparatus includes: a hybrid control unit for requesting neutral control of the transmission according to a state of the inverter applying electric power of a battery to the motor, a state of a relay disposed between the battery and the inverter, and a speed of the motor during coasting of the vehicle; and a transmission control unit for controlling the transmission in a neutral mode at the request of the hybrid control unit.

12 Claims, 3 Drawing Sheets

[FIG. 1]
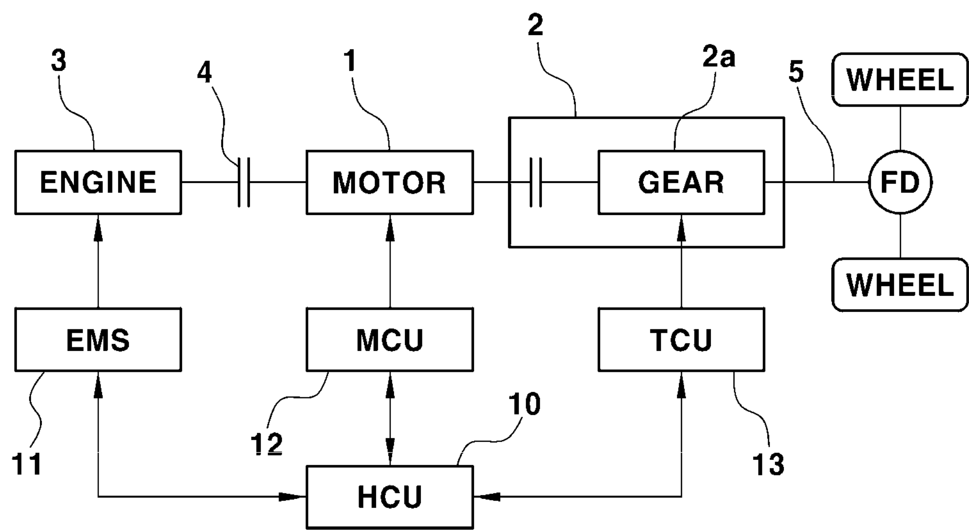
[FIG. 2]
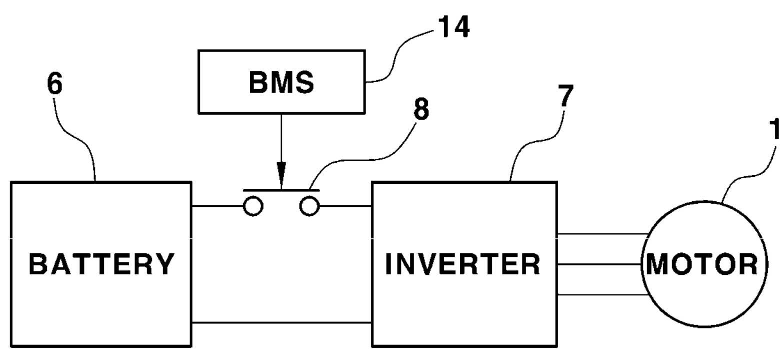

[FIG. 3]
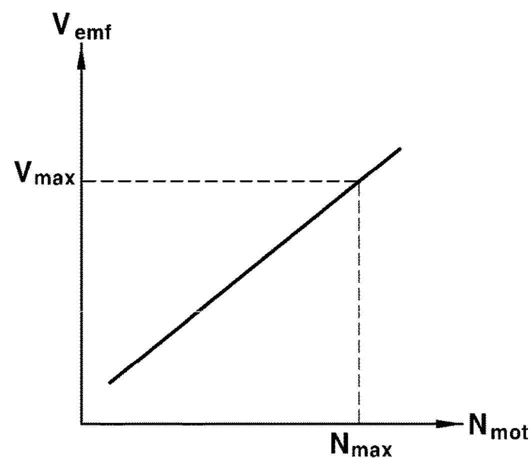
[FIG. 4]
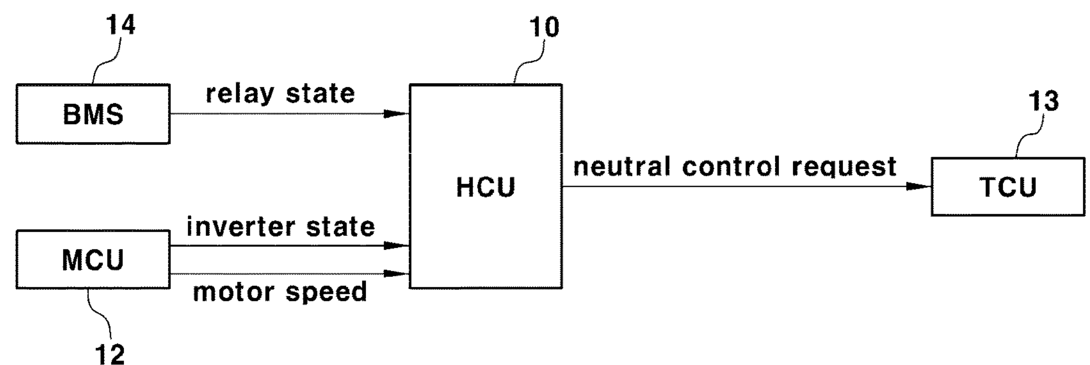

[FIG. 5]
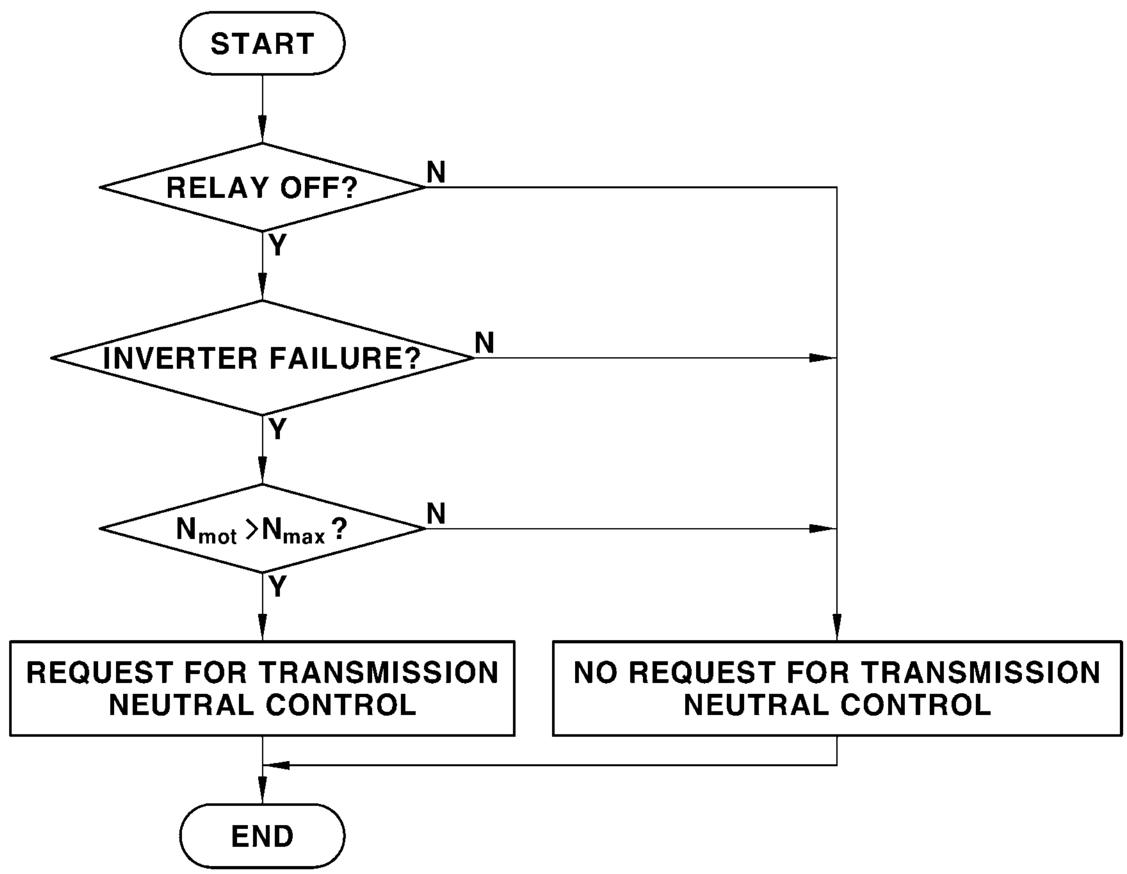

APPARATUS FOR PROTECTING INVERTER OF HYBRID VEHICLE

CROSS-REFERENCE TO RELATED APPLICATION

This application claims the benefit of priority to Korean Patent Application No. 10-2019-0057847 filed on May 17, 2019, the entire contents of which are incorporated herein by reference.

TECHNICAL FIELD

The present disclosure relates to an apparatus for protecting an inverter of a hybrid vehicle. More particularly, it relates to an apparatus for protecting an inverter of a hybrid vehicle, which prevents system damage caused by a failure of an inverter in an electric power system during traveling.

BACKGROUND

In general, a hybrid vehicle is a vehicle using an engine and a motor as driving sources, and is equipped with a clutch and a transmission for transmitting the power output from the engine and the motor to wheels.

In addition, the hybrid vehicle includes a battery for supplying electric power to the motor for driving the motor and an inverter for converting the DC power supplied to the motor into three-phase AC power to apply it to the motor.

The battery supplies electric power to the motor through a relay installed in the circuit between the battery and the inverter, and the inverter is provided with a capacitor connected to the relay for protection of the circuit.

Meanwhile, in a transmission-mounted electric device (TMED) type parallel hybrid vehicle, a motor is connected to a drive shaft of the vehicle with a transmission interposed therebetween, and an engine clutch is provided between the motor and an engine.

In the TMED-type hybrid vehicle coasting with the motor connected to the drive shaft, when an inverter fails and the counter electromotive force of the motor occurs and exceeds the maximum voltage (rated voltage) of the inverter, the capacitor of the inverter may be damaged.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

In an aspect, the present disclosure provides an apparatus for protecting an inverter of a hybrid vehicle, which can prevent damage to a capacitor of an inverter by controlling an operation mode of a transmission to limit a rotational speed of a motor when the inverter fails during coasting in which a counter electromotive force of the motor occurs.

According to an embodiment, an apparatus for protecting an inverter of a hybrid vehicle traveling using a motor connected to a vehicle drive shaft through a transmission and an engine connected to the motor through an engine clutch includes: a hybrid control unit for requesting neutral control of the transmission according to a state of the inverter applying electric power of a battery to the motor, a state of a relay disposed between the battery and the inverter, and a speed of the motor during coasting of the vehicle; and a transmission control unit for controlling the transmission in a neutral mode at the request of the hybrid control unit.

The hybrid control unit may request the neutral control of the transmission to the transmission control unit when the relay is in an off state, the inverter is in a failure state, and the speed of the motor exceeds a first speed. The first speed may be set as a speed value of the motor at which a counter electromotive force exceeding a maximum voltage of the inverter is generated. When the transmission is operated in the neutral mode, a gear of the transmission may be positioned in a neutral range, with the consequence that the motor and the drive shaft are disconnected.

The hybrid control unit may not request the neutral control of the transmission when the relay is in an on state, when the inverter is in a normal state, or when the speed of the motor is less than or equal to the first speed.

The battery and the inverter may be interconnected so as to apply current thereto by the relay when the relay is turned on, whereas an electric circuit between the battery and the inverter may be disconnected when the relay is turned off. A counter electromotive force of the motor applied to the inverter may be limited to a maximum voltage or less of the inverter when the inverter is in a normal state, whereas the counter electromotive force of the motor applied to the inverter may not be limited when the inverter is in the failure state. When the motor is disconnected from the drive shaft, the rotation of the motor by the drive shaft may be stopped.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 1 is a diagram illustrating a power system for a hybrid vehicle;

FIG. 2 is a diagram illustrating an electric power system for a hybrid vehicle;

FIG. 3 is a graph illustrating a proportional relationship between a motor speed and a counter electromotive force;

FIG. 4 is a diagram illustrating an apparatus for protecting an inverter of a hybrid vehicle according to an embodiment of the present disclosure; and FIG. 5 is a flowchart illustrating a method for protecting an inverter of a hybrid vehicle according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

As illustrated in FIG. 1, in a transmission-mounted electric device (TMED) type parallel hybrid vehicle, a motor 1 is connected to a vehicle drive shaft 5 with a transmission 2 interposed therebetween, and an engine clutch 4 is provided between the motor 1 and an engine 3. That is, the motor 1 is connected to the vehicle drive shaft 5 via the transmission 2, and the driving forces (output torque) of the motor 1 and the engine 3 are transmitted via the transmission 2 and the engine clutch 4 to wheels. The hybrid vehicle may be driven by the driving force of the motor 1 connected to the vehicle drive shaft 5 via the transmission 2 and the driving force of the engine 3 connected to the motor 1 via the engine clutch 4.

The hybrid vehicle includes an engine management system (EMS) 11 for controlling the engine 3, a motor control unit (MCU) 12 for controlling the motor 1, a transmission control unit (TCU) 13 for controlling the transmission 2, and a hybrid control unit (HCU) 10 as a superior control unit to the control units 11, 12, and 13.

As illustrated in FIG. 2, the hybrid vehicle is equipped with an electric power system for driving the motor 1. The electric power system includes a battery 6 for supplying DC power to the motor 1, an inverter 7 for converting the DC power supplied to the motor 1 into three-phase AC power to apply it to the motor 1, and a relay 8 installed in the circuit between the battery 6 and the inverter 7. The battery 6 supplies electric power to the motor 1 through the relay 8 when the relay 8 is turned on. The relay 8 may be controlled by a battery management system (BMS) 14.

Although not illustrated in detail, the inverter 7 may include a capacitor disposed in the circuit on the side of the relay 8 in order to protect the inverter circuit from the overcurrent that suddenly flows into the inverter 7.

When the TMED-type hybrid vehicle coasts in the condition that motor torque and engine torque are not generated, the relay 8 is turned off to block the flow of current between the battery 6 and the inverter 7. When the inverter 7 fails, the motor 1 is rotated by the rotational force transmitted through the drive shaft 5, in which case a counter electromotive force Vemf by the rotation of the motor is generated in proportion to the rotational speed Nmot of the motor 1 (see FIG. 3).

In other words, when the failure of the inverter 7 occurs during coasting, the counter electromotive force Vemf according to the rotation of the drive shaft 5 is generated in the motor 1.

When the inverter 7 operates normally, it is possible for the inverter 7 to protect the capacitor of the inverter 7 by limiting the introduction of the counter electromotive force Vemf. However, when the inverter 7 fails, it is impossible to control the application of the counter electromotive force Vemf to the capacitor.

Accordingly, when the inverter 7 fails while the vehicle coasts, the counter electromotive force Vemf generated by the rotation of the motor increases as the rotational speed of the motor 1 increases, in which case the capacitor of the inverter 7 may be damaged when the increased counter electromotive force Vemf exceeds the voltage (rated voltage) of the inverter 7.

Thus, the apparatus for protecting an inverter of a hybrid vehicle according to the present disclosure positions a gear 2*a* of the transmission 2 in a neutral range in order to suppress the counter electromotive force Vemf of the motor 1 from increasing. When the gear 2*a* of the transmission 2 is positioned in the neutral range, the rotation of the motor 1 by the rotation of the drive shaft 5 may be stopped while the motor 1 and the drive shaft 5 are disconnected from each other.

As illustrated in FIG. 4, the apparatus for protecting an inverter of a hybrid vehicle may include the HCU 10 for requesting the neutral control of the transmission 2 when it is predicted that the capacitor of the inverter 7 is damaged while the vehicle coasts, and the TCU 13 for executing the neutral control of the transmission at the request of the HCU 10.

During the coasting, an accelerator pedal for acceleration of the vehicle and a brake pedal for braking are in an off state in which they are not operated, the engine clutch 4 is in a disengaged state, and the gear 2*a* of the transmission 2 is in an engaged state. When a driver does not step on the accelerator pedal and the brake pedal, the output torque of the engine 3 and the output torque of the motor 1 are not generated and no driving force is outputted from the drive shaft 5 to the wheels. When the engine clutch 4 is in the engaged state, the engine 3 and the motor 1 are disconnected from each other to block the transmission of power between the engine 3 and the motor 1. Therefore, during the coasting, the motor 1 and the drive shaft 5 are connected to each other by the transmission 2 to generate a counter electromotive force Vemf in the motor 1 by the rotation of the drive shaft 5. That is, when the vehicle is driven in a coating mode, the motor 1 is rotated by the torque transmitted thereto through the transmission 2 and the counter electromotive force Vemf may be generated by the rotation of the motor 1. When the transmission 2 is in a drive mode in which the transmission gear 2*a* is kept engaged, the motor 1 and the drive shaft 5 are interconnected.

The HCU 10 receives the status information of the relay 8 from the BMS 14 to diagnose and predict whether the damage of the inverter 7 occurs during traveling, and the status information of the inverter 7 and the speed information of the motor from the MCU 12. That is, the HCU 10 grasps the state of the relay 8 by the BMS 14 and grasps the state of the inverter 7 and the speed of the motor 1 by the MCU 12.

The relay 8 is disposed between the battery 6 for supplying electric power to the motor 1 and the inverter 7 for converting the electric power supplied from the battery 6 to transmit it to the motor 1. The relay 8 is connected between the battery 6 and the inverter 7 and is on/off controlled by the BMS 14. The battery 6 and the inverter 7 are interconnected so as to apply current thereto by the relay 8 when the relay 8 is turned on, whereas the electric circuit between the battery 6 and the inverter 7 is disconnected when the relay 8 is turned off so that the flow of current between the battery 6 and the inverter 7 is interrupted.

The inverter 7 serves to convert the DC power supplied from the battery 6 to the motor 1 into AC power to apply it to the motor 1. The HCU 10 may determine whether the inverter 7 fails based on the signal (inverter status signal) transmitted from the MCU 12. The MCU 12 may detect the failure of the inverter 7 when the MCU 12 does not receive a first signal transmitted periodically from the inverter 7 or receives a second signal indicative of the failure of the inverter 7 from the inverter 7. The MCU 12 recognizes the normal state of the inverter 7 by periodically receiving the first signal. When the inverter 7 is normal, the inverter 7 may limit the counter electromotive force Vemf of the motor 1 applied to the inverter 7 to the maximum voltage or less of the inverter 7. When the inverter 7 fails, the inverter 7 does not limit the counter electromotive force Vemf of the motor applied to the inverter 7.

The motor 1 is rotated by the rotational force of the drive shaft 5 transmitted through the transmission 2 in the coasting mode, and a counter electromotive force Vemf is generated by the rotation of the motor 1. The counter electromotive force Vemf is generated in proportion to the rotational speed Nmot of the motor 1. When the rotational speed Nmot of the motor 1 exceeds a set first speed Nmax, a counter electromotive force exceeding the maximum voltage Vmax of the inverter 7 is generated. The first speed Nmax may be set as a speed value of the motor 1 at which the counter electromotive force exceeding the maximum voltage Vmax of the inverter 7 is generated. Accordingly, when the rotational speed Nmot of the motor 1 exceeds the first speed Nmax, the counter electromotive force exceeding the maximum voltage Vmax of the inverter 7 may be introduced into the inverter 7. When the counter electromotive force exceeding the maximum voltage Vmax of the inverter 7 is introduced into the inverter 7, an overvoltage is applied to the capacitor included in the inverter 7, which leads to the breakage (deterioration or explosion) of the capacitor.

Thus, the HCU 10 determines that the inverter 7 will be damaged when the relay 8 is in the off state, the inverter 7 is in the failure state in which its normal operation is impossible, and the rotational speed Nmot of the motor 1 exceeds the set first speed Nmax.

The HCU 10 requests the neutral control of the transmission 2 to the TCU 13 when the damage of the inverter 7 is predicted. That is, when it is expected that the counter electromotive force of the motor 1 is excessively generated in the state in which the inverter 7 fails during traveling and the inverter is damaged due to the counter electromotive force, the HCU 10 executes the neutral control of the transmission 2 through the TCU 13 to limit the rotation of the motor 1.

When the neutral control of the transmission 2 is requested from the HCU 10, the TCU 13 controls the operation mode of the transmission 2 to be in a neutral mode by positioning the gear **2*a* of the transmission 2 in the neutral range. When the transmission 2 disposed between the motor 1 and the drive shaft 5 is controlled in the neutral mode, the motor 1 and the drive shaft 5 are disconnected and the power transmission between the motor 1 and the drive shaft 5** is impossible.

That is, when the transmission 2 is operated in the neutral mode by the TCU 13, the gear **2*a* of the transmission 2 is positioned in the neutral range, with the consequence that the motor 1 and the drive shaft 5 are disconnected to release the power transmission between the motor 1 and the drive shaft 5**.

Thus, by limiting the speed of the motor when the inverter 7 fails, it is possible to prevent the damage of the inverter 7.

When the relay 8 is in the on state even though the inverter 7 is in the failure state and the rotational speed Nmot of the motor 1 exceeds the first speed Nmax, the HCU 10 does not request the neutral control of the transmission 2 to the TCU 13. When the relay 8 is in the on state, the HCU 10 does not request the neutral control of the transmission 2 to the TCU 13.

When the rotational speed Nmot of the motor 1 is less than or equal to the first speed Nmax even though the relay 8 is in the off state and the inverter 7 is in the failure state, the HCU 10 does not request the neutral control of the transmission 2 to the TCU 13. When the rotational speed Nmot of the motor 1 is less than or equal to the first speed Nmax, the HCU 10 does not request the neutral control of the transmission 2 to the TCU 13.

When the inverter 7 is in the normal state, the counter electromotive force applied to the inverter 7 may be limited by the inverter 7. Accordingly, when the inverter 7 is in the normal state even though the relay 8 is in the off state and the rotational speed Nmot of the motor 1 exceeds the first speed Nmax, the HCU 10 does not request the neutral control of the transmission 2 to the TCU 13. When the inverter 7 is in the normal state, the HCU 10 does not request the neutral control of the transmission 2 to the TCU 13.

Hereinafter, an example of an inverter protection method using the apparatus for protecting an inverter having the above structure will be described with reference to FIG. 5.

When the vehicle starts to coast, the HCU 10 determines whether the relay 8 is turned off. The HCU 10 determines whether the inverter 7 fails when the relay 8 is in the off state, and does not request the neutral gear control of the transmission 2 to the TCU 13 when the relay 8 is in the on state. The transmission may be maintained in the operation mode before the coasting begins.

The HCU 10 compares the rotational speed Nmot of the motor 1 with the first speed Nmax when the inverter 7 is in the failure state, and does not request the neutral gear control of the transmission 2 to the TCU 13 when the inverter 7 is in the normal state.

The HCU 10 requests the neutral control of the transmission 2 to the TCU 13 when the rotational speed Nmot of the motor 1 exceeds the first speed Nmax, whereas it does not request the neutral gear control of the transmission 2 to the TCU 13 when the rotational speed Nmot of the motor 1 is less than or equal to the first speed Nmax.

In accordance with the apparatus for protecting an inverter of a hybrid vehicle according to the present disclosure, when the inverter fails during coasting, it is possible to suppress an increase in speed of the motor by positioning the transmission gear in the neutral range to disconnect the motor from the drive shaft, and to prevent the capacitor of the inverter from being damaged due to the overvoltage applied to the inverter by the increase in speed of the motor.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for protecting an inverter of a hybrid vehicle traveling using a motor connected to a vehicle drive shaft through a transmission and an engine connected to the motor through an engine clutch, the apparatus comprising:

a hybrid control unit for requesting neutral control of the transmission according to a state of the inverter applying electric power of a battery to the motor, a state of a relay disposed between the battery and the inverter, and a speed of the motor during coasting of the vehicle; and a transmission control unit for controlling the transmission in a neutral mode at the request of the hybrid control unit.

2. The apparatus of claim 1, wherein the hybrid control unit requests the neutral control of the transmission to the transmission control unit when the relay is in an off state, the inverter is in a failure state, and the speed of the motor exceeds a first speed.

3. The apparatus of claim 2, wherein the first speed is a speed value of the motor at which a counter electromotive force exceeding a maximum voltage of the inverter is generated.

4. The apparatus of claim 1, wherein when the transmission is operated in the neutral mode, a gear of the transmission is positioned in a neutral range, so that the motor and the drive shaft are disconnected.

5. The apparatus of claim 2, wherein the hybrid control unit does not request the neutral control of the transmission when the relay is in an on state.

6. The apparatus of claim 2, wherein the hybrid control unit does not request the neutral control of the transmission when the inverter is in a normal state.

7. The apparatus of claim 2, wherein the hybrid control unit does not request the neutral control of the transmission when the speed of the motor is less than or equal to the first speed.

8. The apparatus of claim 2, wherein the battery and the inverter are interconnected so as to apply current thereto by the relay when the relay is turned on, and wherein an electric circuit between the battery and the inverter is disconnected when the relay is turned off.

9. The apparatus of claim 2, wherein a counter electromotive force of the motor applied to the inverter is limited to a maximum voltage or less of the inverter when the inverter is in a normal state, and wherein the counter electromotive force of the motor applied to the inverter is not limited when the inverter is in the failure state.

10. The apparatus of claim 2, wherein, when the motor is disconnected from the drive shaft, rotation of the motor by the drive shaft is stopped.

11. The apparatus of claim 1, wherein the hybrid control unit grasps the state of the inverter and the speed of the motor by a motor control unit and grasps the state of the relay by a battery management system.

12. The apparatus of claim 1, wherein, during the coasting, an accelerator pedal and a brake pedal of the vehicle are in an off state, the engine clutch is in a disengaged state, and the motor and the drive shaft are interconnected to generate a counter electromotive force in the motor by rotation of drive shaft.

* * * * *